United States Patent Office
3,738,830
Patented June 12, 1973

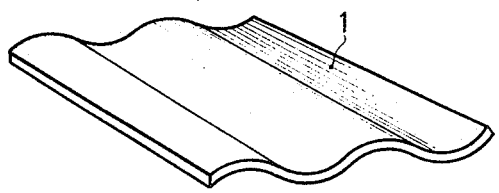
FIG.1.
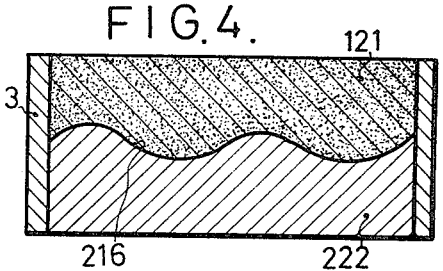
FIG.4.
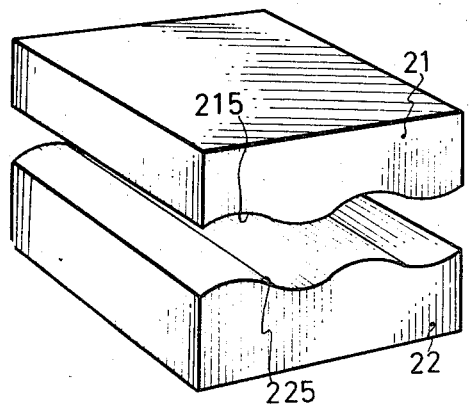
FIG.2.
FIG.3.
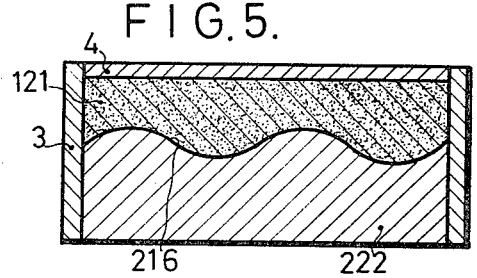
FIG.5.
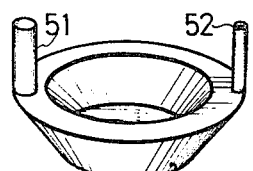
FIG.6.
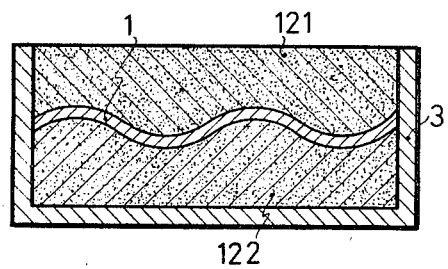
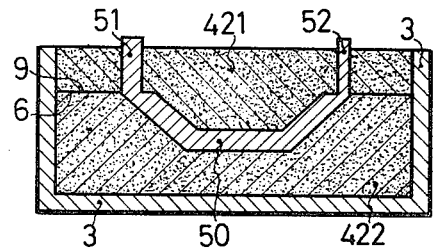
FIG.7.
INVENTORS.
TAKASHI KIMURA,
YOSHIHIKO ABE,
HIROSHI HAMAMOTO,
BY Berman, Davidson & Berman,
ATTORNEYS.

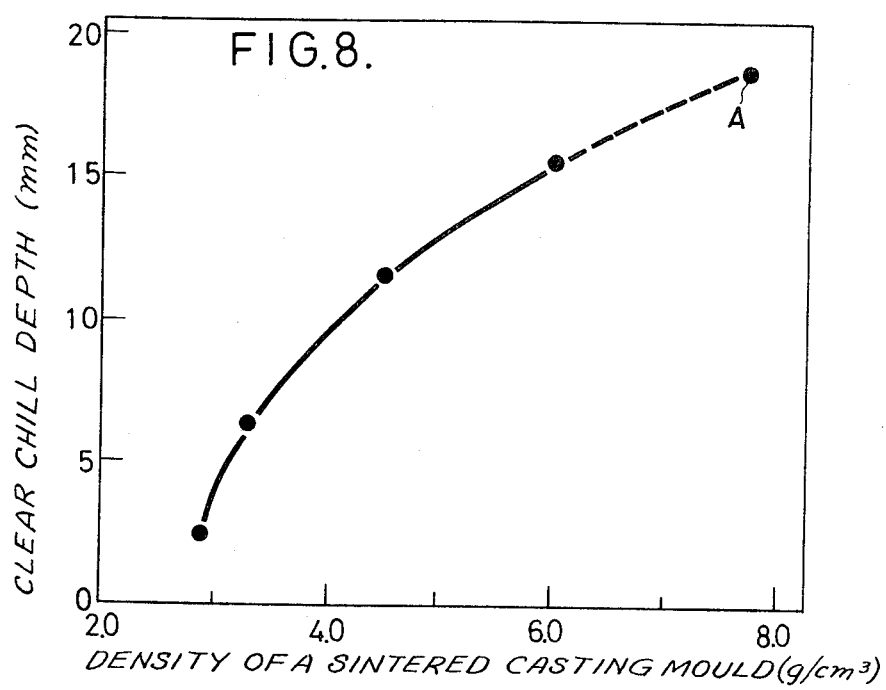
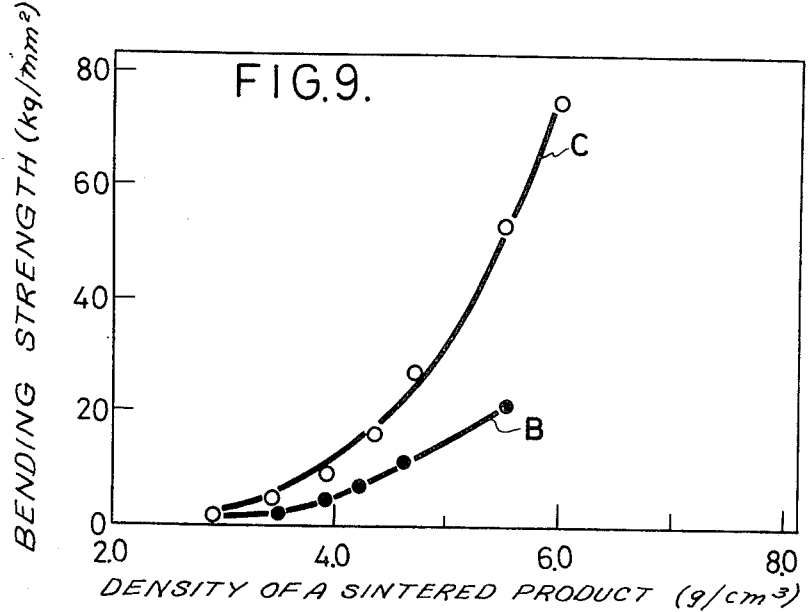

3,738,830
METHOD FOR PRODUCING A METAL DIE OR MOLD
Takashi Kimura, Yoshihiko Abe, and Hiroshi Hamamoto, Nagoya, Japan, assignors to Kabushiki Kaisha Toyota Chuo Kenkyusho, Aichi-ken, Japan
Filed June 26, 1970, Ser. No. 50,219
Claims priority, application Japan, July 7, 1969, 44/53,577
Int. Cl. B22f 1/00
U.S. Cl. 75—214     3 Claims

ABSTRACT OF THE DISCLOSURE

A method for producing a metal die or mold including the steps of placing a pattern, corresponding in configuration to that of the cavity surface of a desired die, in a frame, or box, filling the frame with a sintering powder such as iron, copper, iron and graphite, or mixtures thereof, and heating the powder together with the pattern in the frame to sintering temperature, whereby to form a die complementing the pattern in the configuration.

BACKGROUND OF THE INVENTION

Field of the invention

This invention relates to a process for the manufacture of a metal die, or mold, of metal powder sintered and cooled to form a die in its broadest sense, such as a casting mold, a pressing die, or a die-cast mold.

Description of the prior art

Hitherto, the manufacture of metal dies and molds has been carried out; by engraving, in which steel is machined into a desired mold shape and size by a machine tool; by precision casting, using a Lost Wax Method Mold, Shell Mold, or the like; or by special processing in which the mold material is treated by chemical etching or electrical spark discharge to attain a desired shape.

These known processes require, however, complex manufacturing steps, highly skilled workmen and a great deal of time, and accordingly, are very expensive.

SUMMARY OF THE INVENTION

The present invention provides for the manufacture of a metal die by a sintering process which obviates the disadvantages of the conventional methods briefly outlined above, and which can be performed at low cost, the process being simpler, requiring no finishing machining, and very little skill or training on the part of the workmen.

The improved method comprises the steps of placing a pattern having a desired shape and size, such as needed for a desired mold surface, in an outer frame, filling the frame about and on the surfaces of the pattern, with a metal sintering powder such as iron, copper, iron and graphite, or mixtures thereof, placing the frame together with the pattern and the sintering powder in a sintering furnace, and heating the same to sintering temperature. The resulting product will have a surface configuration which complements that of the surface of the pattern. In the most preferred embodiment of the process, it is contemplated that a heavy metal plate will be placed on the upper surface of the sintering powder inside the frame, and the frame together with the pattern, the sintering powder and the metal plate are sintered in a furnace while the powder is pressed by the weight of the metal plate, whereby the metal plate is integrally united with the completed, sintered die to form a backing thereon. In these processes and variations thereof, as will be described hereinafter, it is possible to sinter after compressing the metal powder, or while compressing the metal powder, to increase the density of the sintered die product.

It will be apparent from the above, that a primary object of the present invention is to provide a method for producing a metal die such as a casting mold or a pressing die, by sintering a metal powder material.

Another object of the invention is to provide a method for producing a metal die without machining.

Still another object of the invention is to provide a method for producing a metal die having precise dimensions.

A further object of the invention is to provide a method for producing a die or mold having high strength and which has a chill-preventing effect on the metal cast in said mold.

A still further object of the invention is to provide a method for producing a metal die which is easy to follow, inexpensive, provides consistent results, and is commercially practicable.

BRIEF DESCRIPTION OF THE DRAWINGS

The novel features that are considered characteristic of this invention are set forth with particularity in the appended claims.

The invention itself, however, both as to its organization and its operation, together with additional objects and advantages thereof, will best be understood from the following descriptions of specific embodiments when read in connection with the accompanying drawings, wherein like reference characters indicate like parts throughout the several figures, and in which:

FIGS. 1–3 illustrate a first embodiment of the invention;

FIG. 1 is a perspective view of a pattern having the shape of a corrugated plate;

FIG. 2 is a perspective view of the metal die formed from powder material placed about the pattern of FIG. 1, and usable to die press or cast products corresponding to said pattern;

FIG. 3 is a central sectional view taken on a vertical plane showing the metal die during the process of manufacture;

FIG. 4 is a sectional view similar to FIG. 3 but showing the second embodiment of the process and usable to manufacture the upper die illustrated in FIG. 2;

FIG. 5 is a sectional view similar to FIG. 4, but showing a third embodiment of the invention to illustrate the production of an upper die similar to that illustrated in FIG. 2, but integrally united with a backing plate;

FIGS. 6 and 7 illustrate a fourth embodiment of the invention in which FIG. 6 is a perspective view of a pattern;

FIG. 7 is a sectional view similar to FIG. 3 illustrating the process of forming the mold;

FIG. 8 is a diagram showing the relation between the density of a casting mold and the clear chill depth of casting; and FIG. 9 is a diagram showing the relation between the density and the bending strength of the sintered die product.

DESCRIPTION OF PREFERRED EMBODIMENTS

The first embodiment of the invention is illustrated in FIGS. 1–3. A heat-resistant, corrugated ceramic plate 1, FIG. 1, is used as a pattern in the process to simultaneously make the upper and lower press dies 21 and 22, FIG. 2, which are capable of use to form a corrugated plate having the identical form as plate 1.

As shown in FIG. 3, an outer frame 3 having a bottom wall so as to form a box, is used for making the press dies 21, 22. The frame 3, or box, is formed of stainless steel and the plate 1 is used as the pattern for forming the pressing surfaces of the press dies. Alumina powder, as a parting agent, is coated on the inner surfaces and bottom of frame 3. A powder mixture of iron-1% carbon-2% copper, by weight, is poured into frame 3 to form a lower layer 122; the corrugated plate 1, whose surface is first coated with alumina powder, is placed on layer 122 in intimate contact therewith, and an additional quantity of the same powder mixture used as a lower layer is poured on the upper surface of plate 1 to fill the frame and form the upper layer 121.

The box or frame 3, with pattern 1 and layers 121, 122, as described is placed in a furnace and sintered at 1100° C. for 5 hours in an atmosphere of nitrogen, while a pressure of about 1.5 kg./cm.$^2$ is applied to the upper surface of the upper layer 121. After cooling, the sintered powders forming layers 121, 122 are removed from the frame 3, as is the pattern plate 1, the layers having hardened to form the upper and lower press dies 21, 22 of sintered metal as shown in FIG. 2.

The lower die surface 215 of the upper die 21 has the same form as the upper surface of corrugated plate 1, and the upper surface 225 of the lower die 22 has the same configuration as the lower surface of corrugated plate 1.

Since alumina powder is used as a parting agent and is coated on the plate 1 and the outer frame 3 so as to be interposed between the layers 121 and 122, the corrugated plate 1 and the outer frame 3 are not united by sintering to the metal powder layers 121 and 122.

In the described example, the corrugated plate 1, as a pattern between the upper and lower layers of powder 121 and 122, prevents the layers from deforming during sintering, and since the metal powders are in intimate contact with the pattern plate, the layers after sintering, cooling and hardening, form surfaces corresponding to the upper and lower surfaces of the corrugated plate, as described.

While in making the initial dies it is necessary to manufacture the corrugated plate 1 for use as a pattern, it is possible to use the product pressed by the formed dies subsequently as the pattern for making additional dies. In such case, it is necessary to press the pattern from a material which will not deform under the temperature and pressure conditions of sintering.

It will be noted in the described embodiment, that the upper and lower dies are manufactured simultaneously.

The above-described process is excellently advantageous because it is simple, does not require skilled labor as compared with conventional processes for the manufacture of metal dies, and requires only simple accessory apparatus such as the outer frame, the pattern and the sintering furnace so that the process is a low-cost one. The process may be used for the simultaneous mass production of dies, or molds, by using a large-sized sintering furnace and simultaneously sintering a number of dies, each in pairs contained within a plurality of frames.

In the second embodiment of the invention, the lower and the upper dies are manufactured separately rather than simultaneously as in the first embodiment. The manufacture of an upper die is described with reference to FIG. 4. Here, a frame 3 without a bottom is utilized to make an upper die such as 21 in FIG. 2. A heat-resistant ceramic pattern 222 having the same shaped upper surface 216 as the lower surface 215 of the die 21, is placed in the frame 3. The upper surface of the pattern 222 and the inner surface of the frame 3 are coated with alumina powder; and a mixture of metal powder for sintering as in the first embodiment described above, is then poured into the frame 3 to cover the pattern 222 and fill the frame to the level of its upper edge, thus forming a layer 121 of sintering powder. A load of about 300 kg./cm.$^2$ is applied to the upper surface of the layer 121 to compress the layer, and the entire assembly including the frame, pattern and layer are then placed in the sintering furnace (without any load) as in the first embodiment. After sintering, and cooling, the hardened layer 121 is removed from the frame 3 and from the pattern 222 to yield an upper die 21 similar to that illustrated in FIG. 2. It should be noted that the metal powder is applied directly on the pattern upper surface within the frame without the need of disposing the pattern in the center of the frame and between two layers of metal powder as in the first embodiment, so that the filling operation is simpler. Dies of constant dimensions may be made by the second embodiment process, and having the same advantages as dies made by the process of the first embodiment. While the upper and lower dies cannot be produced with the same pattern and in the same frame, the scale of production may be increased simply by placing both an upper die pattern and a lower die pattern in a respective frame and sintering both in a large size furnace.

In the third embodiment of the invention, illustrated in FIG. 5, the process is the same as in the preceding embodiment except that a metal plate 4 is placed on the layer of sinter powder 121 and the sintering is carried out while compressing the powder by the weight of said plate, to yield an upper die such as 21, FIG. 2, backed by a metal plate 4 integrally united thereto during sintering. Thus, after metal powder layer 121 is disposed on the pattern 222, and plate 4 is placed on layer 121, in the manner illustrated in FIG. 5, the complete assembly, including the plate, is placed in a furnace and sintered.

The die product obtained following the process of the third embodiment has the same advantages as that obtained following the second embodiment, plus the metal powder is compressed by the weight of the iron plate 4, so that the resulting upper mold die has higher density and greater strength.

It will be obvious that the pattern utilized in the method outlined above may be formed with additional, or other shaped, working surfaces than the corrugated surface of plate 1, or surface 216 of plate 22, as may be necessary in the die desired to be formed.

The fourth embodiment of the invention is illustrated in FIGS. 6 and 7. A hollow, frusto-conical pattern 50 formed of heat-resistant ceramic material and having diametrically disposed, upstanding projections 51 and 52 extending from its upper edge, is used to simultaneously form upper and lower casting molds, which when clamped together define a mold cavity having the shape of pattern 50. The projection, or stick, 51 is instrumental in forming a gate opening to the mold cavity, and the projection, or stick, 52 is instrumental in forming a flow-off duct from the mold cavity. The inner surface of frame 3, and its bottom are coated with alumina powder, and the bottom portion of the frame box is filled with a layer of powder comprised of a mixture of iron-3% graphite, by weight. The pattern, 50, whose entire surface is coated with alumina powder, is placed on said layer and the interior of the pattern is filled with the same mixture of sinter powder up to the level of its upper edge to complete the lower layer 422, which is then coated with a thin parting layer of alumina powder 6 outside of pattern 50. The same sinter powder mixture is then poured on the upper surface of layer 422 and the parting layer 6 to form the upper layer 421 and the powder mixture is compressed under a load of about 300 kg./cm.$^2$. The entire assembly of frame and pattern, surrounded by sinter powder layers is placed in a furnace and sintered at 1100° C. for 10 hours in an atmosphere of nitrogen under no load. After cooling, the sintered layers are removed from the frame and the pattern 50 yielding the hardened upper and lower casting molds whose joint cavity conforms to the shape of the pattern 50.

In the above description of the preceding process, the alumina powder used as a parting, or releasing, agent is applied only on the layer 422, but for convenience of application, the upper surface of the pattern 50 may also be coated with the same parting agent.

Since the layers 421, 422 do not deform during sintering, the upper and lower mold-halves of the split mold produced yield a resulting cavity which is an excellent replica of the pattern 50. Even if the contact surfaces 9 of the upper and lower mold-halves are produced to be more or less uneven, they fit perfectly together since they are manufactured simultaneously. As a result, in using the molds to cast products similar to the pattern 50, there is no danger of runout of the casting liquid, or of fins being formed on the cast product, and it is unnecessary to grind the contact surfaces 9 smooth as in the case where upper and lower mold-halves are manufactured separately.

It has been found that casting molds and press dies obtained by the methods described in the preceding embodiments are usable without trouble, and without observable change in size and shape of either the molds or their pressed or cast products, and the sintered metal molds and dies may be used repeatedly more than ten times before they need be discarded. This contrasts very favorably with sand dies, and the like, which can be used only once to cast a product.

In casting products with metal molds a clear chill layer is usually formed on the surface, which layer has a different crystal construction from that of the interior because it hardens more quickly. To illustrate the clear chill preventing effect of molds manufactured according to the invention in casting iron products, and the relation between the density and the bending strength of the sintered material forming the molds, the following experimental samples were made. Following the process of the fourth embodiment, but varying the pressure applied to the metal powder in the frame, four sample casting molds having respective densities of 2.9, 3.3, 4.5 and 6.0 g./cm.$^3$ were made. These, together with a conventional mold A formed of steel and having a density of 7.7 g./cm.$^3$, were then used to cast products, whose clear chill depths were measured. The results are shown in FIG. 8, in which the density (g./cm.$^3$) of each sintered casting mold is plotted as the abscissa and the clear chill depths (mm.) of the corresponding casting as the ordinate. As seen from FIG. 8, all of the sintered molds are more effective in preventing clear chill than the mold A formed of conventional steel since they show thinner clear chill layers, and this preventing effect is greater as the density of the sintered mold is lowered. The clear chill preventing effect is caused by the low heat conductivity of the sintered metal mold due to its porosity, and which slows the cooling of the external surface of the casting.

The relation between the density and the bending strength of the sintered material forming the dies, or molds, is shown in FIG. 9, in which the density (g./cm.$^3$) of the sintered material is plotted as the abscissa, and the bending strength (kg./mm.$^2$) as the ordinate, the bending strength being that force which causes the sample to break when subjected to bending. Curve B represents the test results of dies formed of iron powder as the sintering material, and curve C as similar tests of dies formed by sintering iron-2% graphite, by weight.

It is clear from FIG. 9 that the bending strength decreases as the density of the die is reduced for both sinter powders mentioned above. In other experiments this was found to be true also for other powder mixtures sintered to form dies.

It will be understood from the above experimental results, that a metal die requiring high strength, such as a press die, may be sintered under conditions which will insure high density of the sintered material. However, for a casting mold, it is necessary to provide clear chill preventing effect, so that it is further necessary to select conditions which produce a density in the sintered material that will satisfy both the clear chill preventing effect and the necessary strength. The density of the sintered die may be preselected and adjusted during fabrication, not only by applying compression or load to the sintering powder, but also by other conditions such as the sintering temperatures and time, particle size of the metal powder used, and others.

The sintering of the metal powder according to this invention may be carried out with or without compressing the powder, and the force of compression may be variously selected, as mentioned above, by applying a backing plate of selected weight to obtain a metal die having suitable strength and especially the clear chill preventing effect, if required for use as a casting mold.

The outer frame 3 prevents the deformation of the metal powder layers during and up to completion of sintering, and these frames may be formed of any material which is resistant to deformation under the applicable conditions of temperature and pressure during sintering of the metal powder. Thus the outer frame 3 may be made of suitable heat-resistant alloys or ceramics.

Materials which do not deform, for example, soften during the sintering of the metal powder, are used for the patterns, and the product formed in the metal mold may be used subsequently without a change as a pattern when making new dies. The pattern of course, should have a higher softening point than the sintering temperature of the powder used for making the sintered die. Similarly when sintered dies are used for casting, they should have a higher softening point than the temperature of the molten casting liquid.

As a practical matter, it is difficult to use castings as patterns, unless they can be filled with a heat-resistant parting agent, such as alumina, magnesia, etc., then pressed, or presintered under such sintering conditions as will prevent the pattern from being deformed, before main sintering.

While iron powder is mainly used as the sintering powder to form the metal die, or mold, other powders generally used in powder metallurgy, such as copper, graphite and carbon, either alone or in admixture, may be used. To obtain a metal die backed by a metal plate, a heavy metal plate is used to compress the metal powder and is in intimate contact with the powder resulting in ease of sintering, but a light metal plate can be used to provide the compression desired.

While the manufacture of an upper die alone, or the simultaneous manufacture of upper and lower dies has been described above, and multi-split molds such as a triple or quadruple split mold can be manufactured by coating the boundary portions of the desired split mold with a parting agent such as graphite, alumina, or magnesia.

Further, this invention can be applied not only to the manufacture of press die and casting molds, but also to the manufacture of die casting molds, molds for plastic, glass and rubber molding, as well as other general metal molds.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What we claim is:

1. A method for producing a set of metal dies, comprising filling the bottom portion of a box with a layer of sintering powder selected from the group consisting of iron, copper, iron and graphite, and mixtures thereof, disposing a heat-resistant ceramic pattern coated with a heat-resistant parting agent for forming a desired die on said bottom layer, coating the exposed surface of said powder layer with a heat-resistant parting agent, further filling the same sintering powder on said parting agent and pattern to form an upper layer, heating the assembly of upper and lower layers with the pattern therebetween to a sintering temperature, whereupon after cooling, a set of porous sintered dies is formed having surfaces conforming to the corresponding surfaces of said pattern.

2. A method according to claim 1, wherein said assembly is compressed during heating for sintering under pressure of about 1.5 kg./cm.$^2$.

3. A method according to claim 1, wherein said parting agent is a powder selected from the group consisting of alumina and magnesia.

References Cited

UNITED STATES PATENTS

| | | | |
|---|---|---|---|
| 1,793,757 | 2/1931 | Smith | 75—226 |
| 1,775,358 | 9/1930 | Smith | 75—226 |
| 1,747,133 | 2/1930 | Pirani | 75—226 |
| 1,853,385 | 4/1932 | Spade | 264—220 |
| 1,940,294 | 12/1933 | Calkins | 75—200 |
| 2,479,364 | 8/1949 | Jocelyn | 75—208 |
| 3,552,955 | 1/1971 | Martyniuk | 75—208 |

FOREIGN PATENTS 984,881   7/1951   France.

CARL D. QUARFORTH, Primary Examiner

B. HUNT, Assistant Examiner

U.S. Cl. X.R.

75—200, 226; 164—37; 264—220